United States Patent [19]
Richards

[11] 3,708,200
[45] Jan. 2, 1973

[54] COMBINATION HOUSE TRAILER AND AIRPLANE HANGAR

[76] Inventor: Daniel E. Richards, 3059 Austin Street, Santa Susana, Calif. 93063

[22] Filed: Dec. 17, 1970

[21] Appl. No.: 99,056

[52] U.S. Cl. .......................... 296/23 R, 52/64, 52/71
[51] Int. Cl. .............................................. B60p 3/42
[58] Field of Search .......... 296/23, 24, 27; 52/27, 29, 52/64, 65, 71, 143

[56] References Cited

UNITED STATES PATENTS

| 2,155,876 | 4/1939 | Stout | 52/71 X |
| 2,964,144 | 12/1960 | Wheeler | 52/65 |

FOREIGN PATENTS OR APPLICATIONS

| 709,198 | 5/1965 | Canada | 52/64 |

*Primary Examiner*—Philip Goodman
*Attorney*—Pastoriza & Kelly

[57] ABSTRACT

An elongated trailer capable of being towed by a vehicle stores disassembled portions of a sectional and collapsible framework.

When the trailer arrives at a location to rendevous with a small aircraft the framework portions may be assembled together and with the front portion of the trailer so the trailer and assembled framework may jointly constitute an aircraft hangar to completely enclose the aircraft. The collapsible framework may be rearranged and partially inverted from one position to another to selectively accommodate high wing aircraft and low wing aircraft.

14 Claims, 8 Drawing Figures

PATENTED JAN 2 1973 3,708,200

INVENTOR:
DANIEL E. RICHARDS
BY
Pastoriza & Kelly
ATTORNEYS

PATENTED JAN 2 1973

INVENTOR:
DANIEL E. RICHARDS

BY

*Pastoriza & Kelly*

ATTORNEYS

COMBINATION HOUSE TRAILER AND AIRPLANE HANGAR

BACKGROUND OF THE INVENTION

This invention relates to aircraft enclosures and more specifically to a trailer and collapsible framework which may be connected to the trailer for sheltering an airplane, and, dismantled from and partially stored within the trailer for transportation purposes.

It is known to construct an aircraft trailer capable of being pulled by a road vehicle and which may be converted into a temporary aircraft hangar as demonstrated by U.S. Pat. No. 3,353,862 to Tormolen. The side walls of the trailer must be swung upwardly to horizontal positions and then pivoted forwardly into coplanar relationship with a rear panel so the three panels along with the trailer roof can constitute a T-shaped shelter. In order to fully enclose the aircraft it is necessary that external objects such as a canvas be stretched over the otherwise open areas to complete the shelter.

A related type of airplane enclosure disclosed in U.S. Pat. No. 3,074,518 to Conrad et al. incorporates hinged side panels that may be swung into collapsed and stacked positions near the roof to facilitate entrance and egress movements of an airplane. Mobile shelters for airplanes are also disclosed in U.S. Pat. No. 2,260,369 to Ebenhack and U.S. Pat. No. 2,652,906 to Mitchell.

A serious drawback of these conventional aircraft shelters is characterized in that the sheltering structures only partially enclose the aircraft and cannot be arranged to fully confine the aircraft without assistance from external materials such as flexible coverings. In addition they are not sufficiently versatile to accommodate differently shaped aircraft such as both high wing and low wing airplanes without consuming an enormous amount of space.

SUMMARY OF THE INVENTION

Briefly stated this invention is a combination house trailer and aircraft hangar that may be easily converted from a structure shaped and dimensioned to fully enclose an airplane to a structure for use as a trailer on the highways and vice versa.

The overall structure incorporates two primary components; namely, an elongated housing and a collapsible framework that may be selectively coupled to and dismantled from the housing. The housing has top, bottom and side walls and is supported by a set of wheels on which the structure may be towed from place to place.

The collapsible framework has a plurality of panels coupled with one another and with the front portion of the housing to constitute a shelter for completely confining the wings and forward portion of either a high wing or low wing airplane.

More specifically the collapsible framework includes a top covering coupled to the housing top wall, a bottom covering coupled to the housing bottom wall, a front covering coupled to the framework top and/or bottom covering, and, a rear covering coupled to the housing side walls.

The top covering includes a roof panel coupled to the housing top wall and a pair of upper wing panels that extend laterally of the housing longitudinal axis and are coupled to opposing sides of the roof panel. The bottom covering includes a floor panel coupled to the housing bottom wall and a pair of lower wing panels extending laterally of the housing and coupled to opposing sides of the floor panel. The upper and lower wing panels are oriented in superposed relationship with their corresponding out board sections connected.

The front covering includes a pair of laterally spaced flap panels coupled to corresponding forward edges to the upper or lower wing panels. A ramp panel positioned in the space between the flap panels is coupled by its rearward end to the front edge of the floor panel. The rear covering includes a pair of rear wing panels hinged to the forward edges of corresponding housing side walls. By this arrangement the rear wing panels may be swung between positions folded backwardly and flush against the housing side walls for travel purposes and positions swung forwardly in engagement with the bottom and front coverings to assist in fully enclosing the space for the airplane.

The four coverings of the collapsible framework are coupled together and with the forward portion of the housing in such a manner that the collapsible framework may be partially rearranged and inverted from one position to another in order to selectively accommodate high wing aircraft and low wing aircraft.

BRIEF DESCRIPTION OF THE DRAWINGS

The numerous benefits and unique aspects of the present invention will be fully understood when the following detailed description is studied in conjunction with the drawings in which.

DETAILED DESCRIPTION OF THE PREFERRED EMBODIMENT

Figure 1:
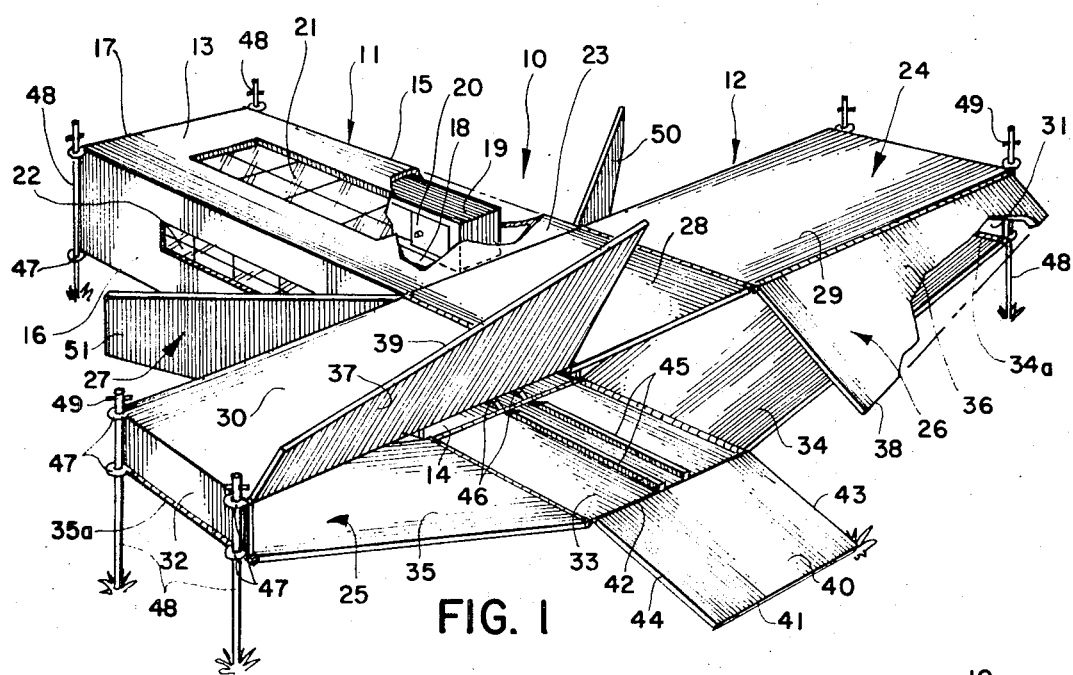
FIG. 1 is a perspective, partially sectional view of a combination house trailer and airplane hangar constructed in accordance with this invention showing, panels of the collapsible framework oriented in various directions to demonstrate how certain panels are mutually connected.

Referring now to the drawings and primarily FIG. 1, a combination house trailer and airplane hangar 10 is shown which is constituted by two basic sections; namely, an elongated trailer or housing 11 and a collapsible framework 12 coupled to a front portion of the housing 11.

The housing 11 has a top wall 13, a bottom wall 14, a left side wall 15, a right side wall 16 and a back wall 17. These housing walls together with the panels of collapsible framework 12 define an interior enclosure 18 for entirely confining and sheltering an aircraft as shall be fully explained. Mounted against the upper interior corners of housing 11 is a pair of overhead cabinets 19 with doors 20. A skylight window 21 is mounted within top wall 13 and side windows 22 are installed within housing side walls 15 and 16.

The collapsible framework 12 is shown coupled to a front portion 23 of housing 11 and includes a top covering 24, a bottom covering 25, a front covering 26 and a rear covering 27. The top covering 24 has a roof panel 28 hinged to the forward edge of top wall 13 and a pair of upper wing panels 29 and 30 coupled to opposing sides of roof panel 28. Upper wing panels 29 and 30 extend laterally of the housing longitudinal axis, extend in opposite directions and terminate in lateral extension panels 31 and 32 respectively which are shown depending perpendicularly from the planes of their corresponding wing panels.

Bottom covering 25 has an intermediate floor panel 33 hinged to the forward edge of bottom wall 14 and a pair of lower wing panels 34 and 35 coupled to opposing side edges of the floor panel 33. Lower wing panels 34 and 35 are oriented in superposed relationship relative to upper wing panels 29 and 30 respectively and their corresponding outer tips are coupled together. More specifically the outer edges of lower wing panels 34 and 35 are detachably coupled by hinges 34 a and 35 a with the lowermost edges of lateral extension panels 31 and 32 respectively. The manner in which these hinges may be swiftly dismantled in order to free the panels from one another will be subsequently explained.

The front covering 26 has a pair of spaced flap panels 36 and 37 that are coupled to the leading edges of upper wing panels 29 and 30 respectively and have free edges 38 and 39 that may be swung into abutting or tight fitting relationship with the leading edges of lower wing panels 34 and 35. A ramp panel 40 coupled to the leading edge of floor panel 33 may be swung upwardly to close the space defined between flap panels 36 and 37.

The rear covering 37 is constituted by a pair of rear wing panels 50 and 51 hinged to the leading edges of housing side walls 15 and 16 so they may be swung forwardly from retracted positions in engagement against the housing side walls to positions of engagement with top covering 24 and bottom covering 25 when maintained at their retracted positions or any selected intermediate positions the space between the top covering 24 and bottom covering 25 may be ventilated.

A track for guiding movement of an aircraft into and out of the enclosed structure is defined by pairs of runners 45 carried by floor panel 33 and registering pairs of runners 46 carried by housing bottom wall 14.

In order to stabilize the house trailer and airplane hangar enclosed structure 10 at a selected location stabilizing means is provided in the form of a plurality of sets of retaining rings 47 secured at various points, anchoring stakes 48 sized to fit vertically through registering pairs of retaining rings 47, and, transverse positioning and locking pins 49 that may be adjustably positioned through retaining holes in the top sections of stakes 48.

Figures 2, 4:
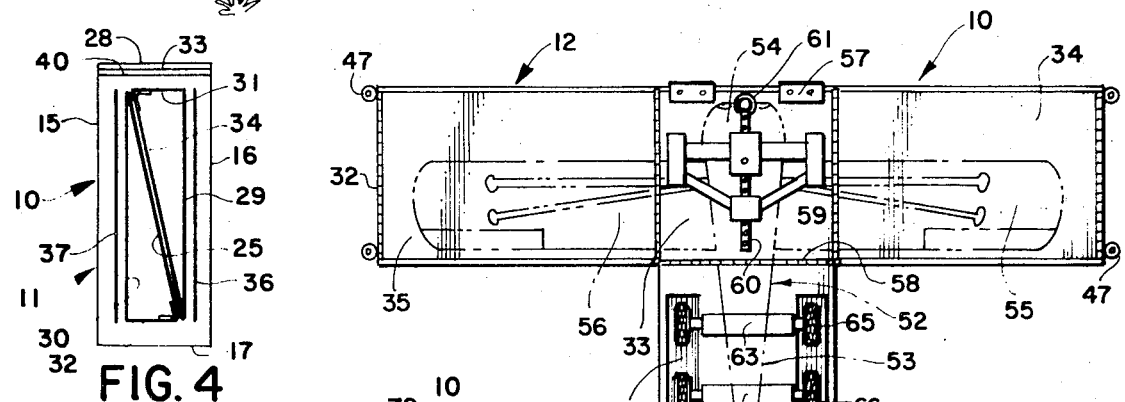
FIG. 2 is a bottom planar view showing the wheels and trailer hitch and outline of an enclosed airplane indicated in dotted lines.
FIG. 4 is a top schematic view, showing the general arrangement of collapsible framework panels stored within the trailer for transportation purposes.

Referring now to FIG. 2 an airplane 52, indicated in dotted lines, is shown confined by the house trailer and airplane hangar enclosed structure 10. The rearward fuselage section 53 of the airplane 52 is primarily confined by the elongated housing 11 while the forward fuselage portion 54 and wings 55 and 56 are confined by the collapsible framework 12. The forward edge of floor panel 33 is coupled to the ramp panel 40 by hinges 57 while the rearward portion of floor panel 33 is coupled to housing bottom wall 14 by hinges 58.

A trailer hitch 59 with a V-shaped frame is welded or otherwise mounted to housing bottom wall 14. It has a retractable bar 60 shown in its rearward retracted position and a ball coupling 61 secured to the forward tip of bar 60 for attachment to a hauling vehicle. A pair of elongated wheel wells 62 and axle housing 63 and 64 accommodate tandem sets of wheels 65 and 66. The end to end distance between each set of wheels is less than the lateral distance between the housing walls 15 and 16. By mounting the wheels within this limit and preventing them from being exposed beyond the side exteriors of the housing, safety precautions as well as compliance with certain vehicle codes will be achieved.

Figure 3:
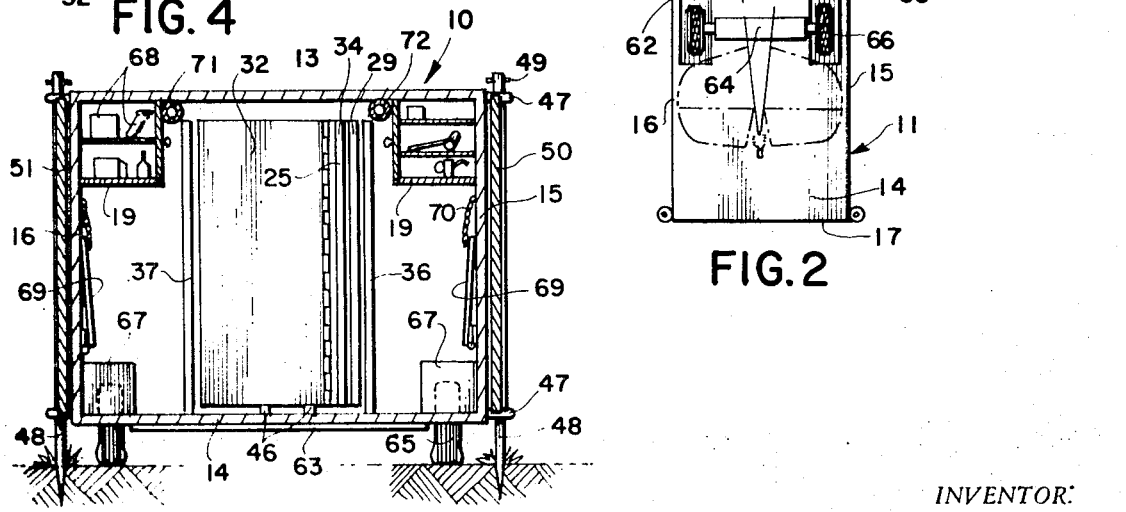
FIG. 3 is a front elevational, sectional view, showing certain panels of the collapsible framework stored for transportation within the trailer and other panels swung backwardly against the trailer side walls.

Referring now to FIG. 3, it can be seen that various and assorted supplies and tools can be conveniently stored on shelves within the overhead cabinets 19. A pair of work benches 69 hinged to side walls 15 and 16 are shown swung upwardly and out of the way for clearance purposes and held in substantially vertical positions by draw chains or cords 70. When the house trailer and airplane hangar structure 10 is fully assembled a person may use the interior as a workshop for repairing airplane components for example. In addition to holding tools and supplies in a handy location, the cabinets 19 may also be used to brace certain stored panels of the collapsible framework. The wheels 65 are covered by protective shells 67 and a pair of overhead conduits 71 and 72 equipped with sprinkler heads are secured to top wall 13. If a fire were to erupt then a conventional sensing and detection system (not shown) would automatically become activated to spray the interior and protect the aircraft or other objects.

Referring primarily to FIGS. 3 and 4, the manner in which certain panels of the collapsible framework may be organized and stored within housing 11 for transportation purposes will now be described. The upper wing panels 29 and 30, the lower wing panels 34 and 35 and the flap panels 36 and 37 are completely dismantled and separated from one another and other panels. Thereafter the upper wing panels 29 and 30 are collapsed into complementary triangular configurations and held against one another as shown most clearly in FIG. 4 to constitute a block or package. With flap panels 36 and 37 positioned against the outer portions of the rectangular package the overall stack is shoved longitudinally into the housing 11. The top corners of this stack of panels are aligned adjacent the overhead cabinets 19 where they may be lashed down in place, cushioned or immobilized in some other suitable fashion.

Figure 6:
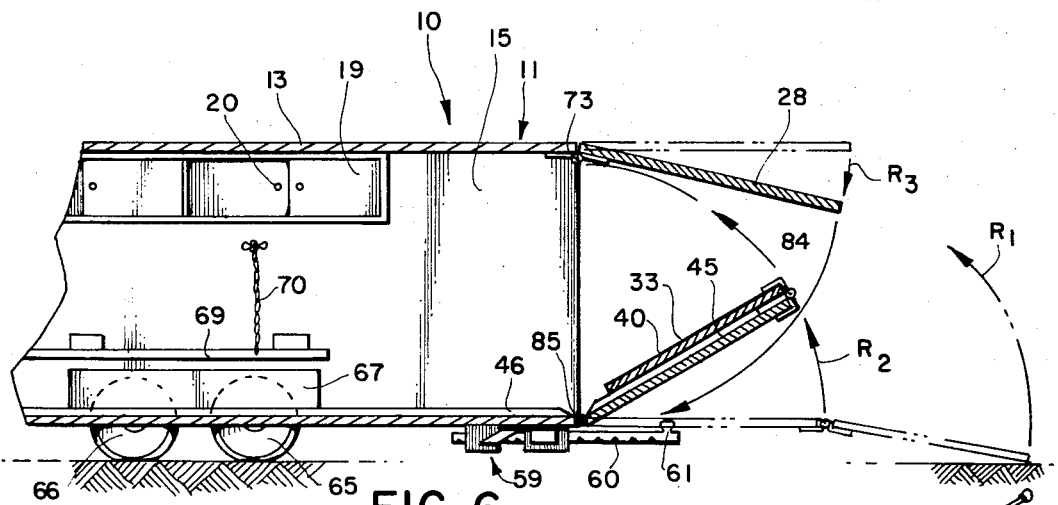
FIG. 6 is a side elevational, sectional view showing how panels of the top and bottom covering of the collapsible framework may be folded together to eventually constitute a front wall for the trailer.

Referring now to FIG. 6 work bench 69 is shown swung down to its operational position and the retractable bar 60 of trailer hitch 59 is shown fully extended so that the ball coupling 61 may be placed in engagement with a complementary fitting of the draw vehicle. After the upper wing panels 29 and 30, lower wing panels 34 and 35 and flap panels 36 and 37 have been uncoupled and freed from the collapsible framework then the remaining panels may be collapsed into positions for traveling purposes. The ramp panel 40, floor panel 33 and roof panel 28 are shown in phantom lines (representing their positions as an aircraft is entering or egressing from its sheltered position) and also in solid lines (representing an intermediate position as the panels are being rearranged to constitute a front wall for housing 11 of three ply thickness).

The ramp panel 40 is pivoted on permanent hinge 84, as indicated by directional arrow $R_1$, until it lies flush on floor panel 33. Then both ramp panel 40 and floor panel 33 in this stacked arrangement are swung inwardly on permanent hinge 85, as indicated by directional arrow $R_2$, until they are aligned substantially vertically. Thereafter roof panel 28 is swung downwardly on hinge 73, indicated by directional arrow $R_3$, until it lies substantially flush against the now erect floor panel 33. Alternatively, roof panel 28 could first be swung into vertical alignment so that the floor panel 33 would ultimately be the exterior panel of the three stacked panels. A suitable latching mechanism (not shown) may be installed to hold the panels together and maintain them in vertical alignment to constitute a front wall for the housing 11.

Figure 5:
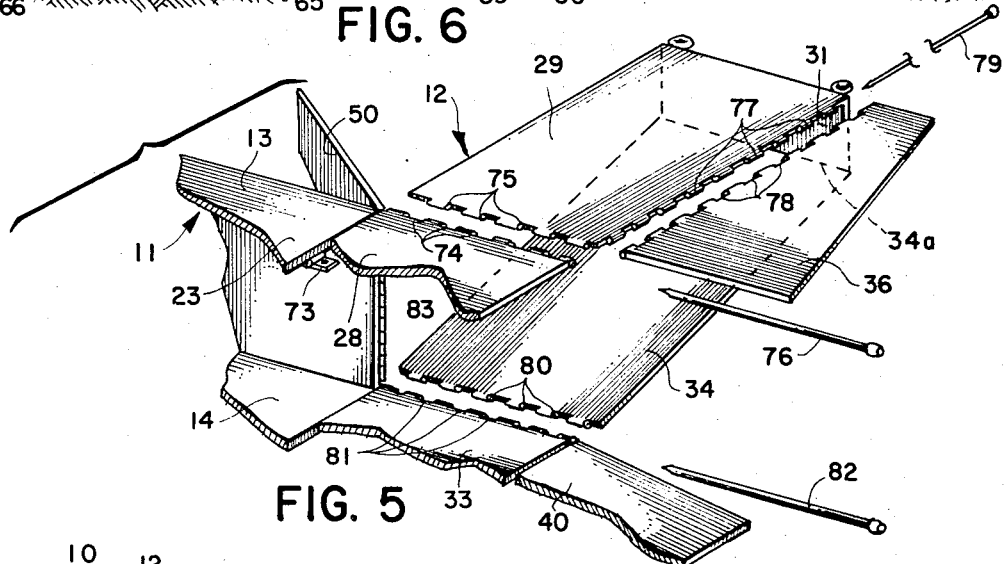
FIG. 5 is a perspective, sectional, partially exploded view showing how panels of the collapsible framework may be detachable or permanently coupled together and to the trailer.

Referring now to FIG. 5 connectors are described for coupling the collapsible framework panels together and for coupling certain panels with the front portion 23 of housing 11. Roof panel 28 and housing front portion 23 are permanently coupled by one or more hinges 73. Roof panel 28 is coupled to upper wing panel 29 by a detachable hinge constituted by a row of spaced eyelets 74 on panel 28, a staggered row of spaced eyelets 75 on panel 29 and an elongated hinge pin 76. In a similar fashion upper wing panel 29 and flap panel 36 are detachably coupled together by eyelets 77, complementary eyelets 78 and hinge pin 79. The same type of detachable coupling may be employed to connect lower wing panel 34 and upper wing panel 29 together at joint 34a. Eyelets 80 and 81 along with hinge pin 82 operate to detachably coupled floor panel 33 and lower wing panel 34. A detachable hinge 83 serves to couple rear wing panel 50 to the leading edge of housing side wall 15. The counterpart couplings of the T-shaped framework are constructed in the same manner.

Figure 7:
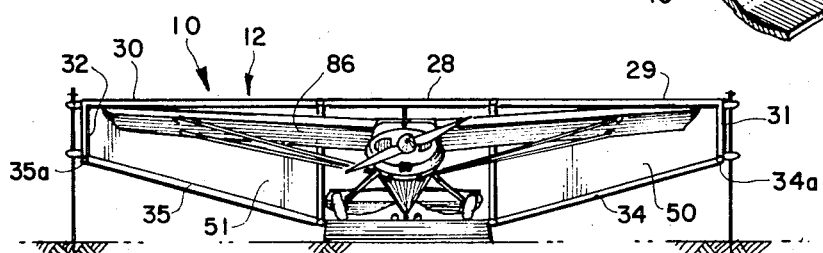
FIG. 7 is a front, partially schematic view showing the collapsible framework coupled to the housing in a manner to accommodate a relatively high wing airplane.

FIG. 7 is essentially a schematic view showing a high wing aircraft 86, which may be a Cessna for example, confined within the house trailer and airplane hangar structure 10.

Figure 8:
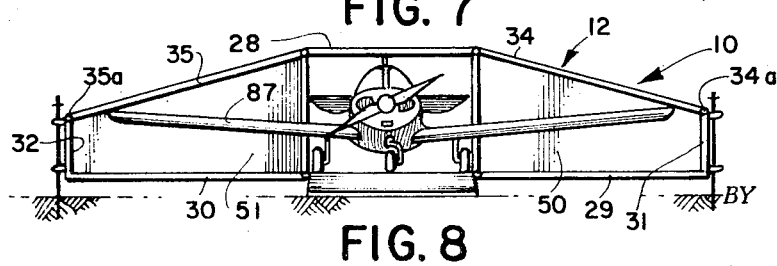
FIG. 8 is a front partially schematic view showing the collapsible framework mounted to the trailer in a manner to accommodate a relatively low wing aircraft.

Referring to FIG. 8 the house trailer and airplane hangar structure 10 is shown rearranged to accommodate a typical low wing aircraft which may be a Piper Comanche for example. The positions of some of the collapsible framework panels as shown in FIG. 7 have been rearranged and inverted in order to provide a space of different cross section for the relatively low slung wing aircraft 87. In essence, the positions of the upper and lower wing panels are switched, and the flap panels are hinged from the lower wing panels. The rear wing panels have been disconnected, rotated through 180° and reassembled.

In general, a door is installed in the housing back wall 18 and additional doors and windows may also be installed for increased natural lighting. Lighting fixtures may be installed within housing 11 and operated from a self-contained battery. A manually or power operated winch may be installed near the back portion of the housing 11 to facilitate the backing-up movement of an aircraft into the enclosed structure. The wheels 65 and 66 may be mounted for retraction into the housing 11. Adjustable jacks for leveling purposes may be furnished at four locations within the housing.

OPERATION

Keeping the above construction in mind it can be understood how the previously described disadvantages of portable aircraft enclosures are overcome or substantially eliminated by the present invention.

While there are numerous situations in which this invention may be practically used one situation shall be explained in detail for purposes of illustration. The housing may be used; as an office, for camping, for storage, for travel or as a trailer. When assembled as a hangar for either low or high wing aircraft it will protect the aircraft from weather, dust, rusting, and paint-peeling. It also may be fireproofed and constructed to discourage vandalism and theft.

Either before or after the aircraft is airborne, the pilot may coordinate with the driver to specify the particular geographical location to which the driver should take the combination house trailer and airplane hangar 10. Upon arriving at the location the driver alone, or with the assistance of another, may swiftly and effectively assemble the collapsible framework 12 onto the front portion 23 of the housing 11, within approximately 20 minutes. The upper wing panels 29 and 30, lower wing panels 34 and 35 and the flap panels 36 and 37, all of which have been stacked together and supported within the housing 11 are withdrawn from the housing.

The roof panel 28 is pivoted upwardly to a horizontal position and the floor panel 33 and ramp panel 40 are then swung outwardly from their erect positions and unfolded so they are aligned substantially flat, as indicated by the dotted lines of FIG. 6.

Hinge pins 76 are used to interconnect the adjacent edges of the roof panel 28 and upper wing panels 29 and 30 and in a similar manner hinge pins 82 are used to interconnect the floor panel 33 with the inner ends of the lower wing panels 34 and 35.

The flap panels 36 and 37 are interconnected by hinge pins 79 to either the forward edges of the upper wing panels 36 and 37 or forward edges of the lower wing panels 34 and 35, depending upon whether a high wing or a low wing aircraft is to be sheltered, as shown in FIGS. 7 and 8 respectively. The rear wing panels 50 and 51 are then unlatched from the housing side walls 15 and 16 and are swung forwardly for attachment to the rear edges of corresponding upper wing panels and the lower wing panels.

To improve stability the wheels 65 and 66 of the housing 11 may be rolled into a ditch or holes dug in the ground. Alternatively a suitable conventional mechanism may be incorporated in the housing to upwardly retract the wheels by hydraulic jacks for example. Anchoring stakes 48 are driven downwardly through registering retaining rings 47 until they penetrate the ground by the necessary distance after which the pins 49 are locked into the top portions of the stakes 48.

After the flap panels 36 and 37 are swung outwardly to open the space intended to enclose the aircraft, the aircraft may be manually shoved backwardly or pulled by a winch into the housing 11 and collapsible framework 12 with the back wheel of the aircraft set within the tracks 45 and 46 for guidance. Once the aircraft is satisfactorily parked the flap panels 36 and 37 and the ramp panel 40 may be swung to close the front.

With the aircraft thus fully confined and safely arranged the pilot may leave the airplane, confident that it is protected.

After the airplane has been removed from its protective enclosure the collapsible framework 12 may be dismantled by simply reversing the procedure outlined above so that the trailer 11 may be moved to a new location.

From the foregoing it will be evident that the present invention has provided a combination house trailer and airplane hangar in which the indicated advantages are fully accomplished.

What is claimed is:

1. A combination trailer and aircraft hangar, comprising:
   a. an elongated housing with top, bottom and side walls, mutually arranged to constitute a shelter for one portion of an aircraft;
   b. wheels mounted to the housing; and,
   c. a collapsible framework coupled to the housing and having:
      c 1. a top covering coupled to the housing top wall and including a roof panel coupled to the housing top wall, and, a pair of upper wing panels extending laterally of the housing and coupled to opposing sides of the roof panel;
      c 2. a bottom covering coupled to the housing bottom wall and including a floor panel coupled to the housing bottom wall, and a pair of lower wing panels extending laterally of the housing and coupled to opposing sides of the floor panel with the upper and lower wing panels being oriented in superposed relationship with their corresponding outer tips connected together;
      c 3. a front covering coupled to the framework to and/or bottom covering and including a pair of laterally spaced flap panels coupled to corresponding forward edges of the upper and lower wing panels, and, a ramp panel positioned between the flap panels and coupled to the floor panels; and,
      c 4. a rear covering coupled to the housing side walls and including a pair of rear wing panels hinged to the front edges of corresponding housing side walls so they may be swung between positions folded backwardly against the housing side walls and positions folded forwardly into engagement with the upper wing panels and lower wing panels, wherein the bottom, top, front and rear coverings are mutually arranged to constitute a shelter for another portion of the aircraft, and, when the framework is collapsed the ramp panel, floor panel and roof panel are stacked together upright constituting a front wall for the elongated housing.

2. The structure according to claim 1, wherein;
the ramp panel and floor panel are mutually hinged, the floor panel is hinged to housing bottom wall and the roof panel is hinged to the housing top wall,
wherein the roof panel may be swung downwardly into erect position and the ramp panel may be folded backwardly onto the floor panel in which condition they may be swung together upwardly into erect position.

3. The structure according to claim 1, wherein;
the upper wing panels and lower wing panels are mutually joined by detachable couplings and are also joined by detachable couplings with the roof panel and floor panel respectively.

4. The structure according to claim 3, wherein;
the upper wing panels, lower wing panels and flap panels are sized so that they may be uncoupled and placed as a stack in the housing for storage and transportation purposes.

5. The structure according to claim 3, wherein;
at least some of the detachable couplings are constituted by interfitting eyelets carried on adjacent edges of the panels and a hinge pin inserted through the eyelets.

6. The structure according to claim 5, wherein;
the collapsible framework panels are structured so that some may be rearranged for selectively accommodating high wing aircraft and low wing aircraft by switching the relative positions of corresponding upper wing panels and lower wing panels, and, inverting the rear wing panels.

7. The structure according to claim 1, including:
a track for guiding an aircraft into and out of sheltered position, the track including runners carried by the floor panel that are aligned with runners carried by the housing bottom wall.

8. The structure according to claim 1, including:
stabilizing means for stabilizing a selected position of the housing and framework.

9. The structure according to claim 8, wherein the stabilizing means includes;
plural vertically aligned sets of retaining rings mounted on the housing and the framework, anchoring stakes arranged through corresponding sets of retaining rings for penetration into the ground, and, pins extending through the stakes to fix their positions relative to the retaining rings.

10. The structure according to claim 1, including:
a workshop built into the housing and having at least one overhead cabinet mounted to an interior wall of the housing and at least one movable work bench mounted to the interior wall of the housing.

11. The structure according to claim 1, including:
a trailer hitch mounted to the housing bottom wall.

12. The structure according to claim 1, including:

tandemly aligned sets of wheels, the end-to-end width of each set of wheels being smaller than the lateral distance between the housing side walls.

13. The structure according to claim 1, wherein; when the framework is fully assembled for operation the combination trailer and aircraft hangar is of general T-shape and capable of completely confining an aircraft without assistance from additional objects.

14. A combination trailer and aircraft hangar, comprising:
 a. an elongated housing with top, bottom and side walls, mutually arranged to constitute a shelter for one portion of an aircraft;
 b. wheels mounted to the housing; and,
 c. a collapsible framework coupled to the housing and having:
  c 1. a top covering coupled to the housing top wall;
  c 2. a bottom covering coupled to the housing bottom wall;
  c 3. a front covering coupled to the framework top and/or bottom covering; and,
  c 4. a rear covering coupled to the housing side walls, wherein, the bottom, top, front and rear coverings are mutually arranged to constitute a shelter for another portion of the aircraft, and, wherein the top, bottom, rear and front coverings are coupled together in such a manner that portions of the coverings may be inverted to selectively accommodate high wing aircraft and low wing aircraft, and, portions of the top covering and bottom covering may be uncoupled and interchanged with one another to constitute a shelter of different cross sectional shape.

* * * * *